R. M. SMITH.
HORSESHOE.
APPLICATION FILED MAY 31, 1916.
1,202,909.
Patented Oct. 31, 1916.
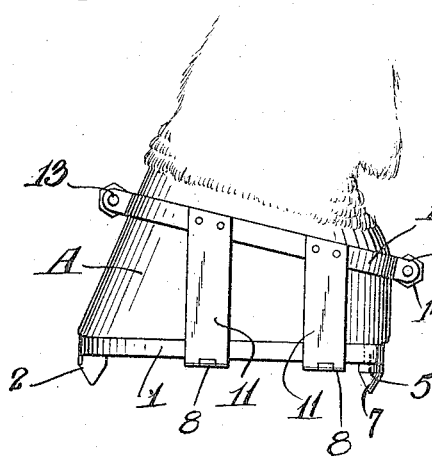
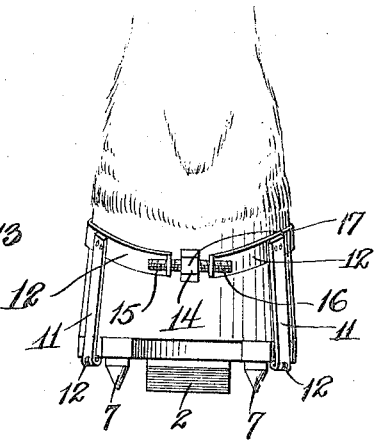
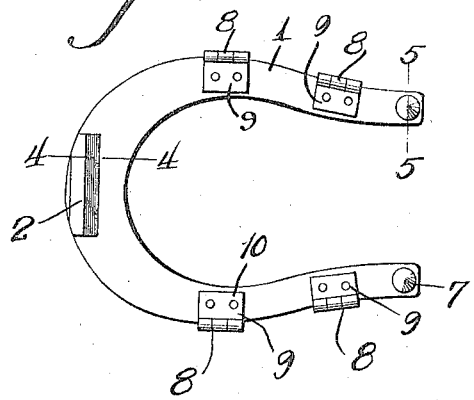
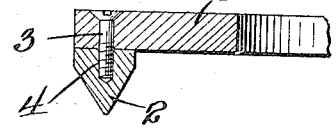
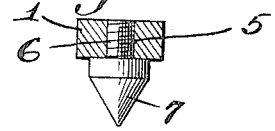
WITNESSES
INVENTOR
Rollie M. Smith
BY
ATTORNEY

UNITED STATES PATENT OFFICE.

ROLLIE M. SMITH, OF KIRWIN, KANSAS.

HORSESHOE.

1,202,909.  Specification of Letters Patent.  Patented Oct. 31, 1916.

Application filed May 31, 1916. Serial No. 100,882.

*To all whom it may concern:*

Be it known that I, ROLLIE M. SMITH, a citizen of the United States, residing at Kirwin, in the county of Phillips and State of Kansas, have invented certain new and useful Improvements in Horseshoes, of which the following is a specification.

This invention relates to an improvement in horseshoes and more particularly to a detachable horseshoe adapted to be quickly and easily attached to or removed from the hoof or the animal when required.

A further object of the invention is the provision of an ordinary horseshoe plate which is adapted to be attached to the bottom of the hoof of the animal in the usual position without the ordinary expedient of nails or other similar fastening elements.

As a further object of the invention the device is provided with a plurality of hinged elements adapted to embrace the hoof of the animal and having means for securely attaching the retaining elements to the hoof.

A further object of this invention is the provision of a horseshoe which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation of a horse's hoof showing the device attached thereto. Fig. 2 is a similar view looking from the rear of the horse's hoof. Fig. 3 is a bottom plan view. Fig. 4 is a fragmentary section on the line 4—4 of Fig. 3. Fig. 5 is a transverse section on the line 5—5 of Fig. 3.

Referring to the drawings wherein is illustrated the preferred form of my invention, the numeral 1 indicates the usual horseshoe plate having the general configuration of the ordinary horseshoe and is adapted to be placed on the bottom of the hoof A. A toe-calk 2 is fastened to the under side of the forward curved portion of the plate 1 by fastening screws 3 which extend through apertures formed in the forward end of the plate and screw threadedly engage in the screw threaded recesses 4 formed in the toe-calk 2. The screw 3 is countersunk for permitting the hoof of the animal to contact evenly with the plate 1. The rear ends of each of the side portions of the plate are provided with screw threaded apertures 5 into which the screw threaded shanks 6 of the heel-calks 7 are mounted.

Secured to each side of the plate 1 is a pair of leaf hinges 8, the leaves of which are of different length as shown by Figs. 1 and 3 of different lengths as shown by Figs. 1 and 3 hinge is secured, through the medium of fastening rivets 10, adjacent the edge of the plate 1, and to the bottom face thereof. The leaves 11 are of a greater length and, when in operative position, extend upwardly to nearly the full height of the hoof of the animal. Secured to the upper terminals of each pair of the longer leaves 11 is a retaining clamp bar 12 which is shaped to fit around the hoof of the animal and is provided with ears 13 at each of its ends. For fastening the side retaining bars 12 to the hoof, I provide the ears 13 of each bar with screw threaded apertures, the threads in one meeting end of one of the bars being right hand and the threads in the opposite end of the opposite bar being left hand. A turn-buckle 14 is provided with the oppositely threaded end shanks 15 and 16 which are disposed within the screw threaded apertures in the ears 13 and the central portion of the turn buckle is provided with a wrench receiving portion 17 by which the turn-buckle may be turned for fastening the retaining bars to the hoof.

The shape of the hoof of the animal prevents the displacement of the shoe and, when the device is snugly secured in place, the shoe is as securely fastened to the hoof as it would be were the usual fastening nails to be used. To remove the shoe it is merely necessary to turn the turn-buckle until the end of the retaining bar 12 is released, whereupon the hinges may be opened by swinging the long leaves downwardly far enough to permit the removal of the hoof. It is pointed out, in this connection, that it is not at all necessary to entirely remove the ends of the retaining bars from the turn buckle, since space enough may be provided by turning the turn buckles to their limits of extension whereby the hoof may be easily removed.

In reduction to practice I have found that the form of my invention illustrated in the drawings and referred to in the above description, as the preferred embodiment, is the most efficient and practicable; yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention, as defined in the appended claims.

I claim:

1. A horseshoe comprising a sole plate adapted to be secured to a hoof, retaining arms formed of arcuate bars having ears provided at each of their ends, said bars being disposed on the opposite sides of the hoof and shaped to fit the curved surface of the upper portion of the hoof, ears formed at each end of the retaining arms and disposed in spaced relation to each other at the front and rear portion of the hoof, turn buckles carried by the ears for fastening said arms to the hoof, and hinged elements connecting said arms with said plate.

2. A horseshoe comprising a sole plate adapted to be secured to a hoof, means embracing the hoof for holding the sole plate in position, said means including ears disposed in spaced relation at the front and rear of the hoof, turn buckles having their ends connected to the ears whereby said means may be made to tightly embrace the hoof, and hinged elements connecting said means with said sole plate.

3. A horseshoe comprising a sole plate adapted to be secured to a hoof, retaining arms disposed upon opposite sides of the hoof and curved to fit the upper portion thereof, means connecting said retaining arms with the sole plate at each side of the hoof, said retaining arms having ears formed at each of their ends, and turn buckles carried by the forward ends of the arms and screw-threadedly connected in the ears, and a second turn buckle mounted at the rear of the hoof and disposed in the ears at the rear of the hoof whereby the said retaining arms may be made to snugly embrace the hoof.

4. A horseshoe comprising a sole plate adapted to be secured to a hoof, retaining arms formed of arcuate bars having ears provided at each of their ends, the ears of each bar being disposed in spaced relation to the ears of the adjacent bar at the front and rear of the hoof, means carried by the ears for fastening said arms to the hoof, and hinge elements connecting said arms with said plate.

5. A horseshoe comprising a sole plate adapted to be secured to a hoof, retaining arms disposed upon opposite sides of the hoof and shaped to fit the upper portion of the hoof, a plurality of hinges having long and short leaves, the short leaves being secured adjacent the outer edges of said toe-plate and the long hinges having their terminals secured to said retaining arms, ears formed on the terminals of each of said retaining arms and disposed at the front and rear of the hoof, a turn buckle carried by the forward pair and the rear pair of said ears for drawing said ears toward each other.

6. A horseshoe comprising a sole plate, retaining arms disposed in parallel spaced relation and curved longitudinally and having their ends terminating in close proximity to each other, each end of said retaining arms provided with an ear, means carried by the ears for fastening the ends of the said arms together, and means connecting the said sole plate with the said retaining arms.

7. A horseshoe comprising a sole plate provided on each of its sides with hinge elements having their elongated portions extending upwardly, retaining arms secured to the said elongated ends, the ends of the said retaining arms terminating in close proximity to each other, and means carried by the ends of each of said arms for causing the said arms to move toward or away from each other.

In testimony whereof I affix my signature in presence of two witnesses.

ROLLIE M. SMITH.

Witnesses:
W. T. FENNER,
J. J. LANDES.

Copies of this patent may be obtained for five cents each, by addressing the "Commissioner of Patents, Washington, D. C."